US008768742B2

(12) United States Patent
Ghosh et al.

(10) Patent No.: US 8,768,742 B2
(45) Date of Patent: Jul. 1, 2014

(54) ASSESSMENT AND RATIONALIZATION OF RESILIENCY OF DATA CENTER STRATEGIES (75) Inventors: Soumyadip Ghosh, Peeks Kill, NY (US); Marek Petrik, Croton-on-Hudson, NY (US); Stacey Ramos, Cedar Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/369,918

(22) Filed: Feb. 9, 2012

(65) Prior Publication Data
US 2013/0211871 A1    Aug. 15, 2013

(51) Int. Cl.
*G06F 17/00*    (2006.01)
(52) U.S. Cl.
USPC ........................................... 705/7.27
(58) Field of Classification Search
USPC ........................................... 705/7.27
See application file for complete search history.

(56) References Cited

U.S. PATENT DOCUMENTS

| 6,789,054 | B1 * | 9/2004 | Makhlouf | 703/6 |
| 8,315,165 | B2 * | 11/2012 | Eydelman et al. | 370/230 |
| 2006/0253839 | A1 * | 11/2006 | Avritzer et al. | 717/124 |
| 2012/0300372 | A1 * | 11/2012 | Bergthold et al. | 361/601 |
| 2013/0086268 | A1 * | 4/2013 | Sloma et al. | 709/226 |

* cited by examiner

*Primary Examiner* — Thomas Dixon
(74) *Attorney, Agent, or Firm* — Scully, Scott, Murphy & Presser, P.C.; Daniel P. Morris, Esq.

(57) ABSTRACT

Assessing resiliency of facility configuration strategies, in one aspect, may employ a mathematical model representation of facility configuration. Organization environment factors and one or more desired performance metrics associated with the organization may be determined. A technical model specification that defines the configuration of facilities of the organization may be received, and a mathematical model representation of the configuration may be created. The mathematical model representation is solved for steady-state characteristics, and one or more values may be estimated respectively of the desired performance metrics based on the steady-state characteristics. The resiliency may be measured based on the estimated one or more values.

22 Claims, 6 Drawing Sheets

ASSESSMENT AND RATIONALIZATION OF RESILIENCY OF DATA CENTER STRATEGIES

FIELD

The present application relates generally to computer-implemented system and methodology for assessing and rationalizing resiliency of strategies for facilities or plants such as data centers.

BACKGROUND

An organization should choose its information technology (IT) strategy on all the data centers it uses so that it provides the right amount of reliability needed by the organization's IT applications. This means striking the best attainable balance between cost of strategy implementation and value it provides. A comprehensive assessment should combine factors such as the particular needs of the organization, such as application uptime needed, physical factors such as quality of data center designs and operations, implications of their geographical locations, effect of various sources of uncertainties, and other factors.

Redundancy is a reliability measure that an organization may implement to provide fail-safe facilities. In IT, redundancy implementation may involve providing duplicate components such as backup systems or minor systems. Existing practice defines redundancy in terms of Tiers (I-IV) applicable to individual data centers. Each Tier of redundancy matches a set of criteria for the reliability of operations, which include the average expected uptime in a year, the number of outage events expected, the severity of the average outage, etc. For example, Tier III operations promise an uptime of 99%, while Tier II updates this to 99.9% and Tier I to 99.99%. While this approach narrows and simplifies the design choices of individual data centers, decisions on combining one or more data centers to support the substantial business computing needs of a firm are made in an ad-hoc manner without the benefit of a rational analysis of the cost of the redundancy defined by a tier and the quantified resilience it provides to the business. They provide no ability to identify any data center strategy's value to the particular needs of an organization. The current metrics used for understanding reliability generally do not facilitate the business decision of understanding the value of availability of the redundancy or resiliency.

BRIEF SUMMARY

A method for assessing resiliency of facility configuration strategies, in one aspect, may include determining organization environment factors. The method may also include determining one or more desired performance metrics associated with the organization. The method may further include receiving a technical model specification that defines configuration for facilities of the organization. The method may also include creating a mathematical representation of the configuration, e.g., Generalized Semi-Markov process representation. The method may further include solving for steady-state characteristics of the created mathematical representation, e.g., Generalized Semi-Markov process representation. The method may also include estimating one or more values respectively of the desired performance metrics based on the steady-state characteristics. The resiliency may be measured based on the estimated one or more values.

The facilities of the organization may include IT data centers housing one or more IT servers running one or more IT applications, wherein the data centers have different operational and location factors that affect their performance. The step of receiving a technical model specification may include determining one or more variables to vary in configuring the facilities of the organization, and defining one or more alternative technical model specifications by varying configuration of the facilities based on said one or more variables. The steps of creating, solving and estimating may be performed for each of said one or more alternative technical model specifications.

A system for assessing resiliency of facility configuration strategies, in one aspect, may include a module operable to execute on a processor and further operable to solve for steady-state characteristics of a mathematical representation, e.g., Generalized Semi-Markov process. The mathematical representation may be created based on organization environment factors and a technical model specification that defines configuration for facilities of an organization. The module may be further operable to estimate one or more values respectively of one or more desired performance metrics associated with the organization based on said steady-state characteristics.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A method and system may be provided for data center (or like facility) strategy resiliency analysis. This method in one embodiment may perform Monte Carlo simulation to determine projections of reliability metrics such as average yearly hours of downtime, average number of outages, average yearly hours of data loss, and others. The simulation may create a detailed model for each data center, incorporating all substantially relevant factors such as a customer's set of business critical applications and their mapping to physical computing capability, the business's downtimes, operational or capital expenses available for upgrades, as well as uncertainties such as equipment failure, human error, local or geographic-scaled disasters, the connection between all the data centers in terms of multiplication of adverse effects (from factors such as natural and man-made disasters) because of application dependence, their geographical proximity and the relationship between application groups and the data centers they are hosted on.

The present disclosure in one embodiment also provides a tool which compares multiple alternative strategies by contrasting the cost of each strategy with the business value of performance. The cost of an alternative strategy could, for example, be represented by the net-present-value (NPV) or annual capital expenditure of investing in building the alternative, or the operational cost. of the alternative. The business value of its performance is measured using one or more metrics such as the annual savings from reduction in outage hours, instances of outage or data loss due to outage (each relative to a base case). This facilitates the rationalization of each alternative strategy and hence the business decision of choosing the best alternative. In this way, one embodiment of the present disclosure provides, an objective analysis may be performed to assess the availability and recoverability of configuration of data centers.

In one embodiment of the present disclosure, the value of availability for resiliency in a system may be considered as a function of the value that is at risk and the probability of the risk causing an outage in system. An analytical tool provided in the present disclosure may perform the mathematics for correlating the variables and produce the graphs (or other outputs) that enable a business decision to be made intelligently.

The variables associated with an organization whose IT system is being evaluated for resiliency, may include: the business critical applications (such as SAP™/Oracle™ databases, high-speed transaction processing systems, etc.) and their relative value to the bottom-line of the business; recovery times from an outage for each application group in each data center based on IT practices; quality of data center and operational factors such as the training and expertise of the data center staff, age and reliability of equipment, etc.; capital and operational expenses. Other variables may be considered and utilized.

The analytical tool also may use parameters such as the historical mean-time between failures (MTBF) of data center and IT equipment; historical man-made and natural disaster outage frequencies; data center design best practices affecting outage mitigation; IT clustering and replication technologies affecting outage mitigation; operational considerations affecting outages. Other parameters may be considered and utilized.

The generated analytics may include: predictive graphs, that for example, may show outages per period (e.g., year), hours of outage per period (e.g., year), hours of data loss per period (e.g., year), and/or others; total exposure and resiliency value on, for example, risk exposure per outage, risk exposure for hours of data loss, risk exposure for hours of outage, and/or others.

Figure 4:
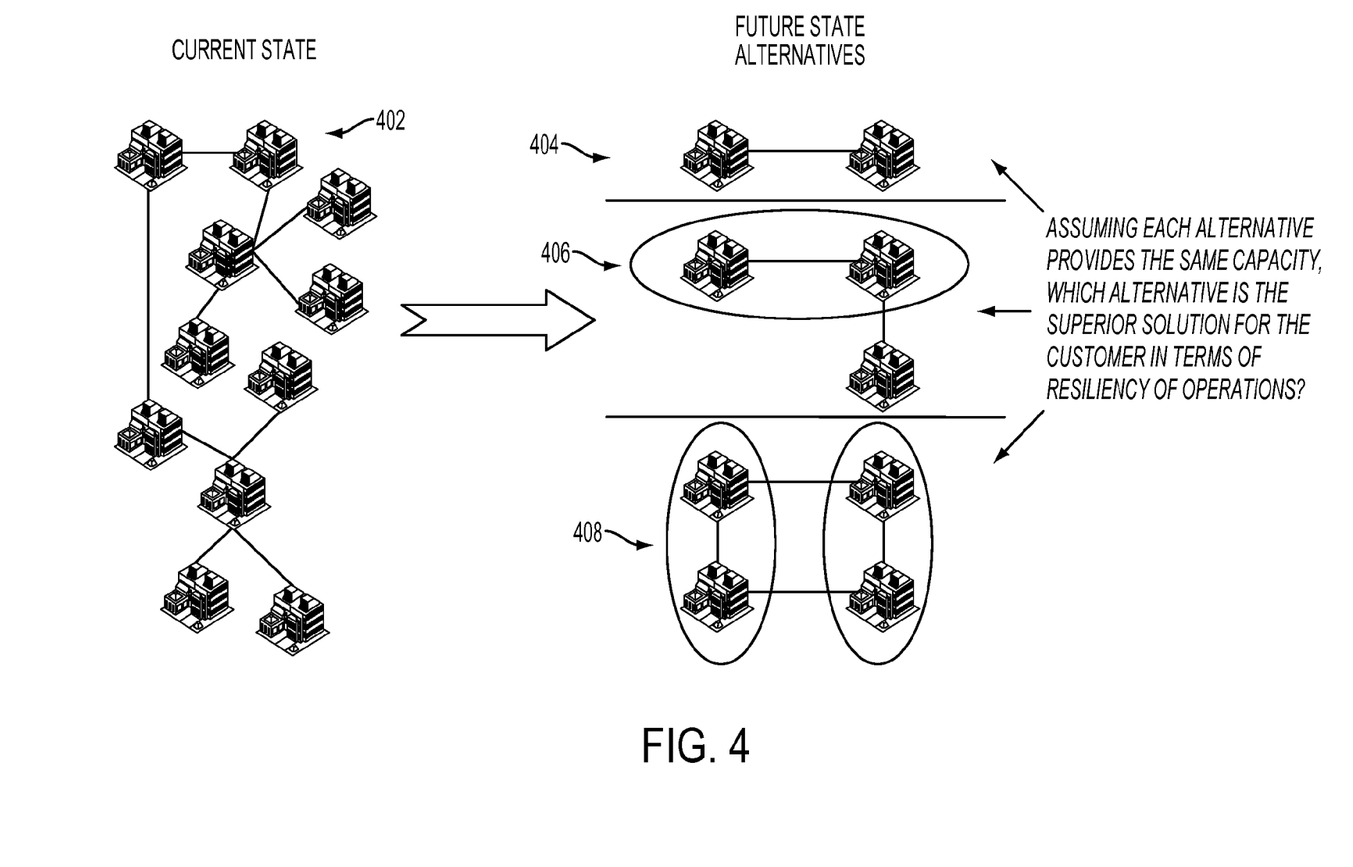
FIG. 4 shows examples of different strategies that may be put in place for different data centers or plants in one embodiment of the present disclosure.

The tool in one embodiment of the present disclosure analyses one or more alternative configurations of the data-center IT strategy. The alternatives can be generated by varying factors that may include: quality of data centers, number of data centers, replication scenarios, clustering techniques, connectivity and dependence between data-centers and/or others. FIG. 4 illustrates examples of different strategies. For example, the current state of data centers for an IT organization may be represented at 402. Other possible alternative configurations may include data center configurations shown at 404, 406 and 408. Each alternative is analyzed by the tool to estimate the performance metrics of interest to the firm. These include the average time of outages, the average incidences of outages, data losses due to unavailability of the applications and others. The tool of the present disclosure evaluates each of the different strategies for their resiliency and value to the organization.

Figure 2:
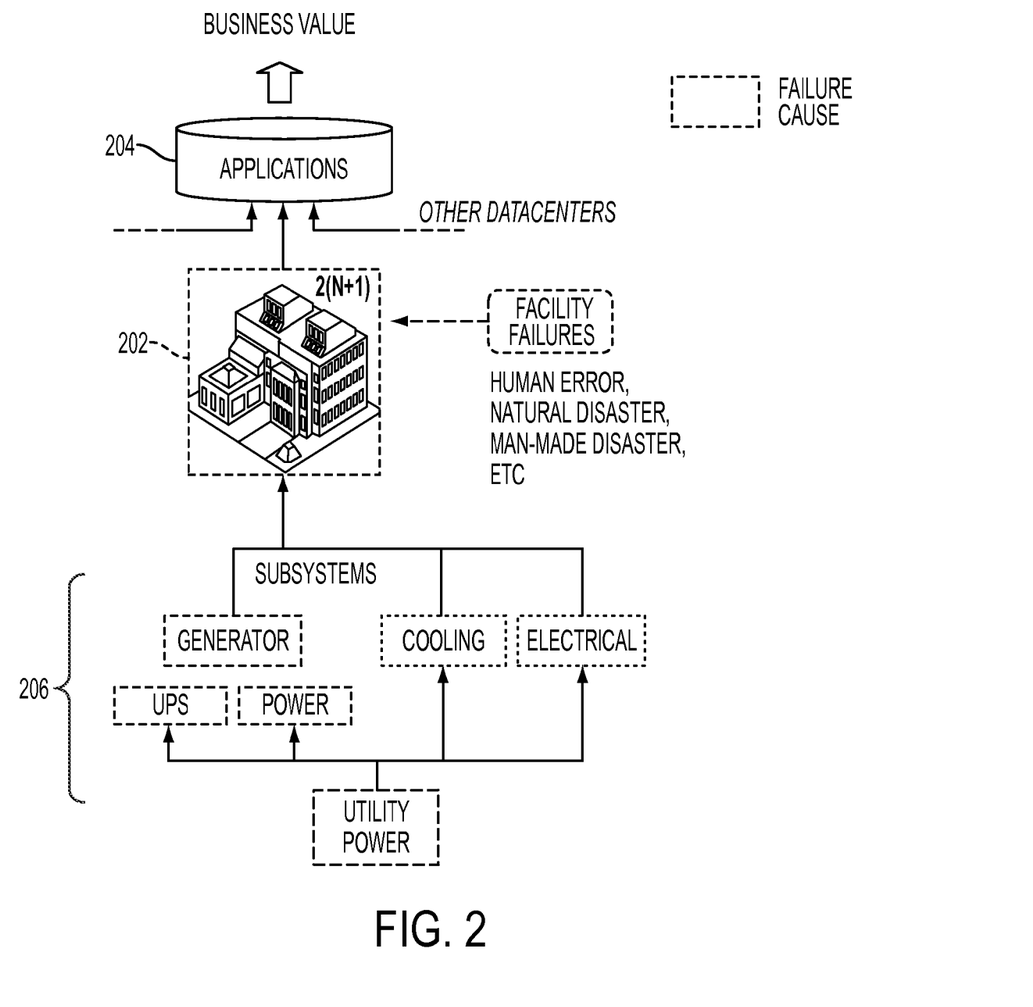
FIG. 2 shows an application supported by a data center and the data center's subsystems and factors that the data center depends on for its operation, in one embodiment of the present disclosure.

FIG. 2 is a diagram illustrating an application failure model. A data center failure may be caused by facility failures, for example, due to human error, natural disaster, man-made disaster, or others. Failures at the data center 202 may also occur if any one of its subsystems 206 fail, for instance, power generator failure, cooling system failure, and/or electrical system failure. Organizations relying on the data center to run their business face risks and suffer when the data center fails to deliver the needed IT. Such risks may be quantified as a value.

Figure 1:
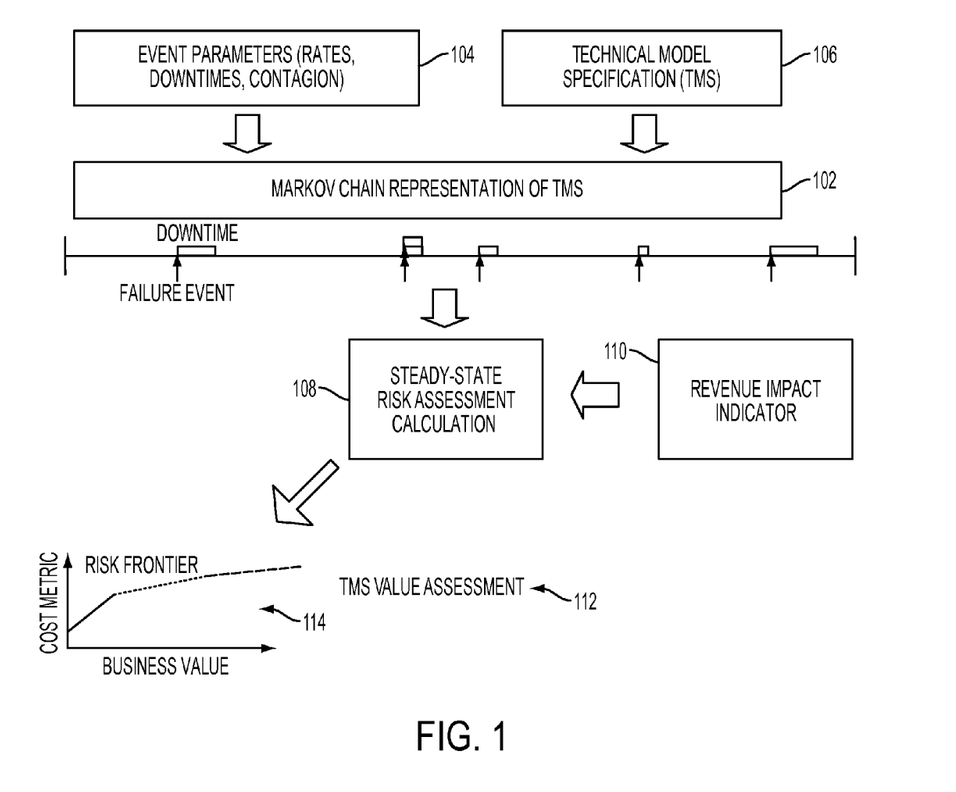
FIG. 1 shows components employed for assessing and rationalizing resilience of facility or plant strategies in one embodiment of the present disclosure.

FIG. 1 illustrates a risk resiliency analytics model in one embodiment of the present disclosure. Event parameters 104 define the parameters of the various operational factors and uncertainties that form the environment of the business operations, and technical model specification (TMS) 106 are each of the alternatives that the tool analyzes. For example, TMS 106 may include a number of alternative or different specifications for allocating or assigning current data centers throughout geographical locations. The tool mathematically models the operation of the IT data center strategy, for example, as a Markov chain or another Generalized Semi-Markov process. While the example shown describes a Markov chain model, it should be understood that other one or more mathematical models may be utilized.

Referring to FIG. 1, inputs 104 and 106 are used to create the Markov chain representation 102. A Markov chain model is built for each of the technical model specifications 106 in one embodiment of the present disclosure. The performance of each alternative is estimated using the value of the relevant metrics under steady-state conditions. Steady-state risk assessment calculation 108 may be produced from the Markov Chain representation by one of many techniques that include a discrete event simulation of the Markov chain, or by algebraically solving the set of equations that define its steady state. Revenue impact indicator 110 defines the parameters that determine the business impact of the performance of the alternatives. Inputs from 110 may be utilized with the steady-state risk assessment calculation 108 to determine the value assessment of the alternatives.

Examples of event parameters 104 may include MTBF of data center and IT equipment, man-made and natural disaster outage frequencies, data center design characteristics such as quality of data center operations (human experience/expertise) factors, IT clustering and replication technologies. It may also include all business operational considerations such as the application groups being used and their relative value to the business, average recovery times of applications from an outage event, and capital and operational Expenses in running the alternatives.

The alternatives 106 analyzed by the tool can be generated by varying factors that may include: quality of data centers, number of data centers, replication scenarios, clustering techniques, connectivity and dependence between data-centers and/or others. Technical model specification 106 refers to the specification of each of these variable values.

Markov Chain representation of TMS 102 is a mathematical model of the operation of the alternative that can further be analyzed to obtain an estimate of the performance of the alternative (TMS) under the operating environment of the business.

In one embodiment of the present disclosure, Markov chain state space is defined as the state of a system represented using finite set of values. For instance, TMS state may include the state of each datacenter (DC) in the alternative and can be represented using the vector ($DC_1$ state, $DC_2$ state, ..., $DC_n$ state), where $DC_i$ state is a value from the set {0 if up and running, 1 if down for outage cause 1, 2 if down for cause 2, ..., K if down for cause K}. Here, for explanation, the various outage-causing factors have been assumed to order {1, 2, ..., K}. For example, if DC1 is affected by natural disaster (cause 2) and DC2 by utility failure (cause 3) and the rest are all up and running, then the state of the system will be (2, 3, ..., 0)

As a further example, the state of a data-center can be further broken down into the state of its components. So, the representation of $DC_1$ state itself may be a set of values such as {$C_1$ state, $C_2$ state, ..., $C_{M1}$ state}, where the DC1 is represented as including components $C_1$, ..., $C_{M1}$. As a further example, the state of these components may be chosen from the set {true, false} to indicate whether the component is functioning or not. Similarly, each $DC_i$ state may be set to ($C_1$ state, ..., $C_m$ state), and the state of the alternative TMS state may be set to (($C_1$ state, ..., $C_{M1}$ state) of $DC_1$, ..., state, ..., $C_{Mn}$ state) of $DC_n$), and example of which is ({false, true, false, false, ..., false}, ..., (false, false, true, false, ..., false}).

FIG. 2 shows data centers with such example states. As seen in the figure, the various components of the IT system have a complex relationship with the outage state of the business applications being run on them. For instance, a data center (DC) 202 that run an application 204 has a number of different factors that may contribute to its failure or down time. For examples, facility failures, human error, natural disaster, man-made disasters and other may cause the data center 202 to be out of operation. Examples of subsystems 206 which the data center 202 may depend on for running its operations may include generator, cooling facility, electrical facility, other utility and power subsystem. An application 204 may also depend on other data centers. An "Application down" state may be reached if either any of its supporting DC has a state other than (0, 0, ..., 0), or may be reached only if all DCs leave this state, i.e. suffer some form of outage (provide that any DC state with a value other than "0" implies DC is unavailable). Thus, certain DC-unavailable states imply TMS unavailability, hence application unavailable. These complex rules are captured as part of the Markov Chain representation in one embodiment of the present disclosure. As an example, a rule may establish that all database applications (DB2™, SAS™, Oracle™, etc.) will be unavailable if both DC1 and DC2 are down due to any one or more causes.

Markov model prescribes transition rates between states as Markov Chain transition matrix. Transitions may occur in one embodiment of the present disclosure as a Poisson process, i.e., each state is occupied for time given by an exponential random variable with specified rate. For example, if average downtime because of cause 2 is a day, DC1 state may transition from {0,1,0,0,0} to {0,0,0,0,0} at rate 1/1440 per minute, given there are 1440 minutes to a day. Further, proximity of DCs (either physically or over network connections) affects joint-transition of DCs to site-wide failure states. As an example, DCs in the same local region may suffer site-wide damage from a regional flood event, while DCs that are geographically remote are unaffected by the flood. As a further example, DCs that are connected as parts of the same logical network may both be simultaneously affected by a man-made event such as a malicious disruption of service.

The state-space representation of the Markov Chain along with the transition probabilities between states and the definition of application-downtime as a function of the state of the Markov Chain provides a complete mathematical model of the operation of the entire IT eco-system that supports the business. Each alternative TMS changes one or more of the factors of this model including transition probabilities, application-downtime rules, etc.

Steady-state risk assessment calculation 108 refers to the assessment of performance of the alternative based on the steady state of the Markov Chain mathematical model of the alternative. The steady-state representation of the Markov Chain is the characterization of the system after it has been operational for an "infinite" amount of time. For example, if the data-center TMS configuration is initiated at a state where all DCs (and their components) are in a fully-operational state and the Markov chain is allowed to evolve according to the transition probabilities and the rules defined and in the absence of any other outside influences except for those that have already been accounted for in the model, the Markov Chain is expected to settle into its steady-state, where it devotes a steady fraction of its time in each possible state. In most instances, steady-state probabilities of being in any particular state coincide with the long run average fraction spent in that state, given that the average is performed over a long observation of the Markov Chain.

Steady-state analysis may associate a penalty function with visiting any state of Markov Chain. For example, if the Markov Chain visits a state that represents a downtime for the business critical applications, one may associate a penalty of, say $1 million per hour of outage. The steady-state analysis will then report the average penalty rate of the Markov Chain; continuing the example, the steady state analysis may report that the chosen TMS alternative results in $ 14.5 million per year due to outage penalties, which are expected to be 14.5 hours per year.

The steady state characteristics of a Markov Chain can be determined given the transition matrix of the model using a set of algebraic equations defined over the transition matrix and the Markov Chain states. The solution to these equations determines the long run average time spent in a state, and can be used in estimation of average penalty paid at each state. The process of solving the system of linear equations can be very cumbersome for Markov Chain defined over a large state space, which is the set of all possible states. In this case, an alternate mechanism to determine steady-state characteristics is to perform a discrete event simulation of the Markov Chain model, where the chain is successively evolved from a suitably defined initial state and long-run penalties are directly calculated over an observation of a lengthy life-time of the simulation.

Data center strategy analysis may include steady-state analysis of Markov Chain model of data center configuration alternative that provides estimates by either solving the characteristic equations or from a discrete event simulation. For example, the performance metric of interest may be the average number of yearly outages, only counting outages that last beyond t minutes, where t≥0 is pre-specified. This metric may be estimated from the steady state yearly average number of visits to "application unavailable" state by associating a penalty function, which is set a value of 1 if time spent in an "application unavailable" state is greater than t, and 0 otherwise. The long-run average value of this penalty function will thus be the desired performance metric. As another example, the desired performance metric may be the average annual minutes of outage, only counting outages that last beyond t minutes, where t≥0. This metric may be estimated from the steady state annual average time spent in "application unavailable" states with a penalty function that takes the value max{0, time spent in "application unavailable" state−t}. Here, the penalty function records the amount of time spent in "application unavailable" state beyond the threshold t, recording a zero for times less than the threshold.

Revenue impact indicator 110 refers to the various performance metrics of interest and their associated parameters. For example, the business may be sensitive to the number of application availability interruptions. The user will then choose the average annual outage incidences as the metric, and further provide a penalty value associated with each outage, e.g., $1 million per outage event. The tool provides a set of such standard indicators, which may for example be parameterized by business value, for example including average yearly minutes lost (with parameter average outage cost per minute), average yearly minutes lost only counting outages greater than a threshold (with parameter average outage cost per minute beyond the threshold), average number of outages per year (with parameter average cost per outage event), average number of outages per year only counting outages greater than a threshold (with parameter average cost per outage event longer than the threshold). The steady-state characteristics of the Markov Chain are combined with these chosen metrics to provide an assessment of all the input alternatives. Table 1 provides a few examples of 110.

TABLE 1

Performance Indicator and Parameter Examples

| Performance Indicator | Parameter |
|---|---|
| Exposure Per Outage ($) | Outages per year |
| Value of Transactional Data | Data loss per year (in years) |
| Value of Availability | Downtime per year (in years) |

TMS value assessment 112 may assess the performance of the input set of alternatives as measured by the specified performance metrics. A steady-state measurement of each performance metric is done for each specified alternative. These values are then presented to the user in one or many ways. An example output graph is shown at 114.

In one embodiment of the present disclosure, an X-Y axis graph may be generated that plots each alternative specified against the estimated values of the desired performance metrics. The graph may show the alternatives on the X Axis and on Y Axis showing metrics such as outages per year (count), data loss per year (in hours), downtime per year (in hours), and/or cost (e.g., USD). Each of the Y-axis values may be adjusted for the input parameters: threshold times for outage and data loss, selection of one or more business-critical application groups, and as absolute values or relative to the current state.

The resulting graphs or charts may provide an objective measure of "how much is enough". In another embodiment of the present disclosure, a chart, for example, may be plotted containing a set of lines, each line representing one alternative. The X axis may represent the input revenue impact indicator parameter and the Y axis may represent the measured revenue impact under each alternative. This graph will then display the performance of each alternative over a plausible range of parameter values. For example, the X-axis may plot a range of plausible values for the penalty (in million $) per outage, and the Y-axis may plot the total annual penalty due to outage events.

In one embodiment, charts may be grouped in pairs: e.g., an "A" chart may show the Exposure Liability, which is the value of each performance metric. This may for example be the annual costs of outage events that the business is exposed to due to a particular alternative. The "B" chart may show the Resiliency Value, which is the difference between the cost of the alternative and the Exposure Liability. The resiliency value is thus the value of investing in each alternative. The cost of each alternative is specified as part of the Revenue Impact Indicator factors 110, and can for example be the annual capital expenditure or Net Present Value of investing in each alternative, or the annual operational cost of each alternative.

Figure 6:
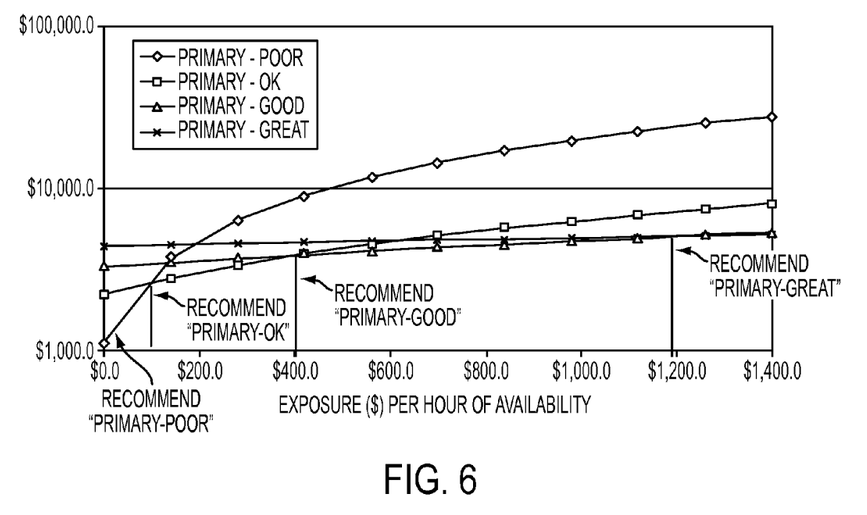
FIG. 6 shows an example of a graph that compares four technical model specification (TMS) alternatives in one embodiment of the present disclosure.

A further embodiment of this disclosure may provide a set of graphs of the types described above that is plotted in the X- and Y-axis where the axes-ranges are over an event-horizon of plausible alternatives. For example, consider the graph where the X-axis may plot values for the penalty (in million $) per outage, and the Y-axis may plot the total annual penalty due to outage events, and each alternative is plotted as a trajectory of total annual penalty as a function of penalty per outage. Each alternative may represent the most economical (i.e., least Y-axis value) over a range of the X-axis. The event-horizon is the union of all such ranges of X-axis values. A graph that plots the whole event-horizon provides a view of what is called the efficiency frontier of this performance metric, which is the most economical Y-axis value for every X-axis value and the associated alternative that achieves this economical value. FIG. 6 shows an example, where four TMS alternatives are compared "Primary-Poor", "Primary-OK", "Primary-Good" and "Primary-Great". The graph plots the cost exposed per hour of lost availability in the X-axis as "Exposure $ per hour of availability", against the net exposure under each alternative in the Y-axis. At each point in the X-axis one alternative qualifies as the most economical one to choose, and this choice varies over the X-axis. The tool identifies the points at which the most economical status switches over from one alternative to another. In this example, this happens only at three points corresponding to an X-axis value of $100/hr, $400/hr and $1200/hr. The output display thus customizes the graph to only display this range in the X-axis and the most economical alternative beyond this range is easily understood to be that which is economical at each end-point of the graph.

Figure 3:
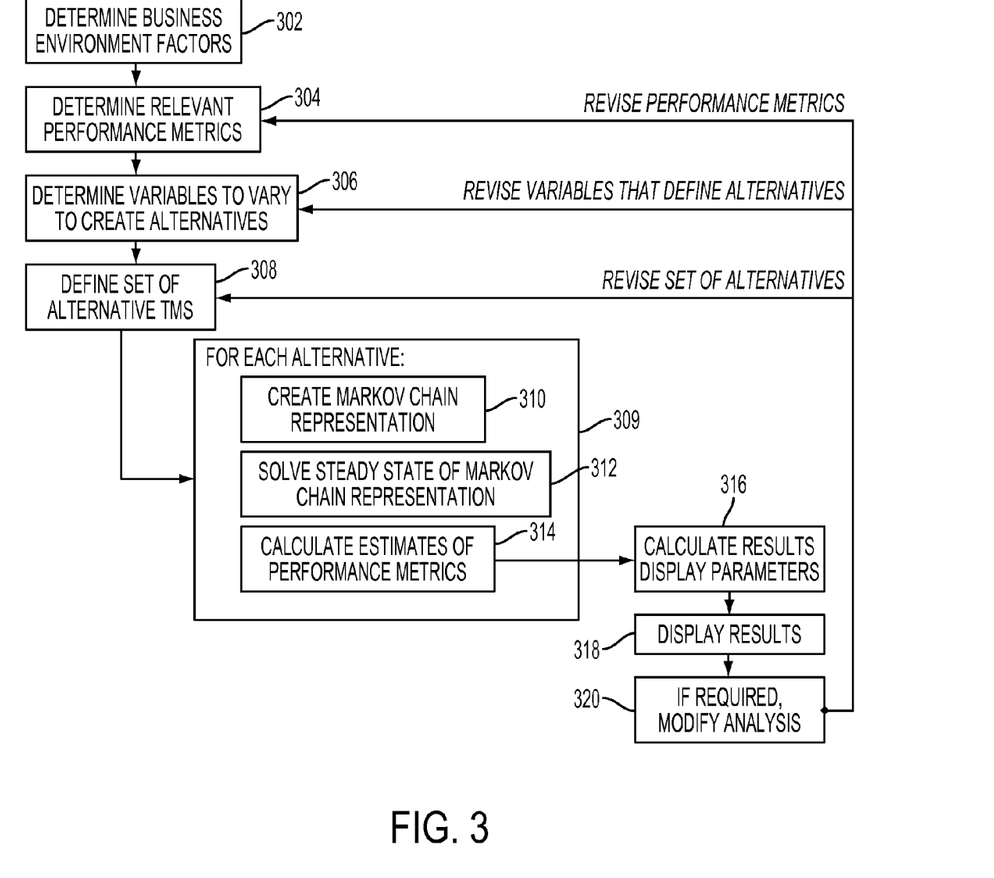
FIG. 3 is a flow diagram illustrating a method of assessing and rationalizing data center strategies in one embodiment of the present disclosure.

FIG. 3 is a flow diagram illustrating a method of assessing and rationalizing resiliency of data center strategies in one embodiment of the present disclosure. At 302, the method may include determining business environment factors such as IT requirements of business-critical application groups, MTBF of IT equipment, data center operations quality, rate of man-made or natural disasters in datacenter location etc. Determining may include receiving such business environment factors for inputting into a mathematical model of the present disclosure in one embodiment. At 304, the method may include determining performance metrics that are most important to the business, such as average number of application outages, average time of outage, etc. At 306, the method may include determining the variables that can be varied to create alternatives, such as quality of staffing each datacenter, quality of computing equipment within each datacenter, quality of support equipment within each datacenter, location of data centers, manner in which critical applications are spread over multiple data centers, etc. At 308, the method may include creating a set of alternatives to study. Note that a further embodiment of the method of the present disclosure may include a process which can systematically explore the space of all alternatives created by varying the factors above using pre-defined rules, e.g., choose all possible locations and explore the placement of ten data centers over all possible locations. In another embodiment, the technical model specifications may be received for inputting into the mathematical model of the present disclosure.

At 309, for each TMS, steps 310, 312 and 314 may be performed. At 310, Markov Chain mathematical representation is created. At 312, the steady-state characteristics of the created Markov chain representation are solved. At 314, estimates of long-run average of each desired performance metric are obtained. At 316, the relevant parameters are calculated to display results. For example, the method may include calculating the event horizon of business impact parameters over which various alternatives are most economical. At 318, the results are displayed or presented in one or more of the various methods, for instance, described above, to allow a user to compare and contrast all chosen alternatives. At 320, the method may, based on current results, revise the analysis by choosing new performance metrics, in which case, the logic of the method returns to Step 304; New variables to define alternatives, in which case, the logic of the method returns to Step 306; New set of alternative specifications to compare, in which case, the logic of the method returns to Step 308.

The above-described method in one embodiment of the present disclosure assesses resiliency of data center configuration strategies so as to determine a value it provides to functioning of an organization. The value of data center strategy resiliency may be determined by comparing the benefit of higher resiliency against the cost of implementing the strategy. The value of data center strategy may be computed as random variables defined by probability distribution functions. The IT system of the organization may comprise multiple IT applications running on multiple IT servers housed in multiple data centers located in multiple geographic locations. The multiple data centers may have different operational and location factors that affect its performance. The data center operations may be specified as random variables defined by probability distribution functions. The location factors that affect data centers may be specified as random variables defined by probability distribution functions. The operational factors may include staffs operational qualities, data center site's hardening and utility provider's reliabilities. The location factors may include geo-political stabilities, man-made disaster vulnerabilities and/or natural disaster vulnerabilities, or other factors associated with the location of data centers. The resiliency of a data center may be measured by the average hours of outage suffered by selected IT applications, for example, those considered to be key IT applications. The resiliency of a data center may be measured by the average number of outages suffered by such select IT applications. The resiliency of a data center may be measured by the average hours of data loss suffered by such selected IT applications. The cost of implementation may be measured, for example, by real capital expense, real operational expense, the sum of the real total expense, net present value (NPV) of capital expense, NPV of operational expense, or their sum, the NPV of Total Expense, or combinations thereof.

The methodology of the present disclosure may also apply to assessment of strategies for configuring plants or facilities other than data centers. For example, organizations that have multiple plant sites may utilize the methodology employing appropriate event parameters and technical model specifications associated with those plant sites.

In addition, it should be understood that the mathematical model built in the present disclosure is not limited to a Markov chain model. For example, other state-based stochastic models may be implemented. State-based models may include a class of Generalized Semi-Markov processes (GSMPs), of which Markov chains are one type. Other examples include systems that are defined via stochastic differential equations, where Gaussian random variables form the basic building block of the uncertainty, as opposed to exponential distributions used in Markov Chains. Steady states of Markov chains are also defined via a set of equations, which are "like" differential equations. GSMPs are similar to Markov chains and the steady-state solution process is almost identical.

Figure 5:
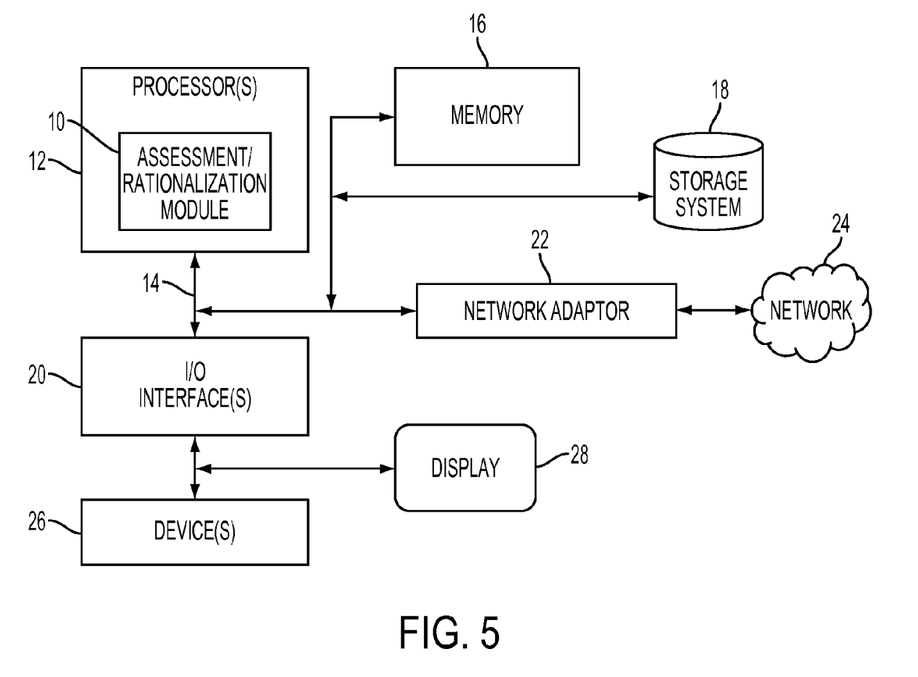
FIG. 5 illustrates a schematic of an example computer or processing system that may implement the assessment system in one embodiment of the present disclosure.

FIG. 5 illustrates a schematic of an example computer or processing system that may implement the assessment system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an assessment module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for assessing resiliency of facility configuration strategies, comprising:
    determining organization environment factors;
    determining one or more desired performance metrics associated with the organization;
    receiving a technical model specification that defines configuration for facilities of the organization;
    creating a Generalized Semi-Markov process representation of the configuration;
    solving, by a processor, for steady-state characteristics of the created Generalized Semi-Markov process representation; and
    estimating one or more values respectively of the desired performance metrics based on said steady-state characteristics,
    wherein said resiliency is measured based on said estimated one or more values.

2. The method of claim 1, wherein the facilities of the organization include IT data centers housing one or more IT servers running one or more IT applications, wherein the data centers have different operational and location factors that affect their performance.

3. The method of claim 2, wherein the step of receiving a technical model specification includes:
    determining one or more variables to vary in configuring the facilities of the organization; and
    defining one or more alternative technical model specifications by varying configuration of the facilities based on said one or more variables.

4. The method of claim 3, wherein the steps of creating, solving and estimating are performed for each of said one or more alternative technical model specifications.

5. The method of claim 4, further including:
    generating one or more graphs that plot each of said alternative technical model specifications specified against the estimated values of the desired performance metrics.

6. The method of claim 4, further including:
    calculating an event horizon of the desired performance parameters over which said one or more alternative technical model specifications are most economical.

7. The method of claim 3, wherein said one or more variables to vary includes at least one or more of location of said data centers, quality of staffing each datacenter, quality of computing equipment within each datacenter, quality of support equipment within each datacenter, manner in which applications are spread over said data centers, clustering of said data centers, network connectivity among said data centers, or combination thereof.

8. The method of claim 1, wherein said step of receiving a technical model specification that defines configuration for facilities of the organization includes automatically generating a plurality of technical model specifications by varying one or more factors in configuring the facilities based on one or more pre-defined rules.

9. The method of claim 1, wherein said organization environment factors include at least one or more of IT requirements of said organization, mean time between failure of IT equipment, data center operations quality, rate of man-made failures, or natural disasters in locations of said facilities, other operational factors associated with said organization, or other locational factors associated with said organization, or combinations thereof.

10. The method of claim 1, wherein said desired performance metrics include at least one or more of average number of application outages, average time of outage, or average time of data loss, or combinations thereof.

11. A system for assessing resiliency of facility configuration strategies, comprising:
    a processor;
    a module operable to execute on the processor and further operable to solve for steady-state characteristics of a Generalized Semi-Markov process representation, the Generalized Semi-Markov process representation created based on organization environment factors and a technical model specification that defines configuration for facilities of an organization, the module further operable to estimate one or more values respectively of one or more desired performance metrics associated with the organization based on said steady-state characteristics, wherein said resiliency is measured based on said estimated one or more values.

12. The system of claim 11, wherein the facilities of the organization include IT data centers housing one or more IT servers running one or more IT applications, wherein the data centers have different operational and location factors that affect their performance.

13. The system of claim 12, wherein the module is further operable to determine one or more variables to vary in configuring the facilities of the organization, and define one or more alternative technical model specifications by varying configuration of the facilities based on said one or more variables.

14. The system of claim 13, wherein the module is further operable to create said Generalized Semi-Markov process representation, solve for said steady-state characteristics, and estimate said one or more values, for each of said one or more alternative technical model specifications.

15. The system of claim 14, wherein the module is further operable to generate one or more graphs that plot each of said alternative technical model specifications specified against the estimated values of the desired performance metrics.

16. The system of claim 14, wherein the module is further operable to calculate an event horizon of the desired performance parameters over which said one or more alternative technical model specifications are most economical.

17. The system of claim 14, further including a graphical user interface operable to allow a user to interactively create said one or more alternative technical model specifications and associated Generalized Semi-Markov process representations, interactively change said one or more organization environment factors and said one or more desired performance metrics, wherein the user is enabled to compare resiliency measures determined based on different parameters.

18. A non-transitory computer readable storage medium storing a program of instructions executable by a machine to perform a method of assessing resiliency of facility configuration strategies, comprising:
    determining organization environment factors;
    determining one or more desired performance metrics associated with the organization;
    receiving a technical model specification that defines configuration for facilities of the organization;
    creating a Generalized Semi-Markov process representation of the configuration;
    solving, by a processor, for steady-state characteristics of the created Generalized Semi-Markov process representation; and
    estimating one or more values respectively of the desired performance metrics based on said steady-state characteristics, wherein said resiliency is measured based on said estimated one or more values.

19. The non-transitory computer readable storage medium of claim 18, wherein the facilities of the organization include IT data centers housing one or more IT servers running one or more IT applications, wherein the data centers have different operational and location factors that affect their performance.

20. The non-transitory computer readable storage medium of claim 19, wherein the step of receiving a technical model specification includes:
   determining one or more variables to vary in configuring the facilities of the organization; and
   defining one or more alternative technical model specifications by varying configuration of the facilities based on said one or more variables.

21. The non-transitory computer readable storage medium of claim 20, wherein the steps of creating, solving and estimating are performed for each of said one or more alternative technical model specifications.

22. The non-transitory computer readable storage medium of claim 21, further including:
   generating one or more graphs that plot each of said alternative technical model specifications specified against the estimated values of the desired performance metrics.

* * * * *